United States Patent Office 2,908,796
Patented Oct. 13, 1959

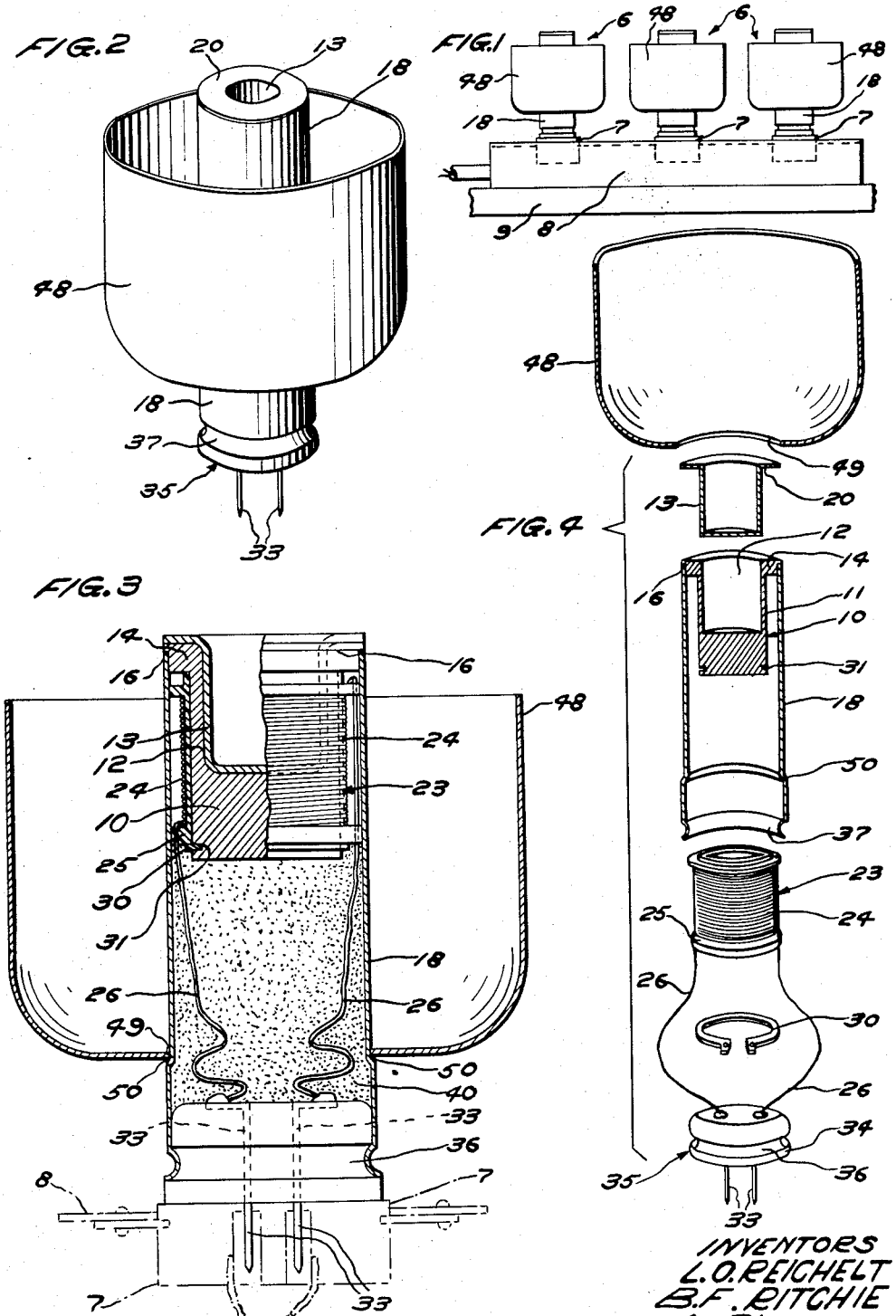

2,908,796
ELECTRICAL SOLDER POT

Lester O. Reichelt, Downers Grove, Ill., and Bertram F. Ritchie, Edina, Minn., assignors to Western Electric Company, Incorporated, New York, N.Y., a corporation of New York Application November 27, 1956, Serial No. 624,627

5 Claims. (Cl. 219—44)

This invention relates to electrical solder pots and more particularly to unitary electrical devices for holding and melting solder or other materials.

An object of the present invention is to provide a new and improved electrical solder pot capable of being detachably applied to an electrical connector receptacle and supported thereby in operating position.

Another object of the invention is to provide electrical melting pot units capable of being attached to vertically disposed electrical connector receptacles in a power line for connecting them to a source of current and for supporting the melting pots in vertical operative position in closely spaced relation to each other.

Another object of the invention is to provide an electrical melting pot having a removable heating element to permit the replacement thereof with heating elements of different predetermined heating capacities.

A further object of the invention is to provide an electrical solder pot having a readily replaceable liner for holding the molten solder.

A further object of the invention is to provide an electical solder pot having an annular apron removably mounted thereon for catching the dross scraped from the solder.

A device for holding and melting solder and the like which illustrates certain features of the invention may include a cup-shaped melting pot having an outwardly directed flange at the upper end thereof which is pressed into the upper end of an elongated thin walled tubular metal shell, and a heating element is removably mounted on the solder pot and has leads connected to the prongs of an electrical connector plug which is removably secured to the lower end of the shell and is insertable into a conventional electrical connector receptacle mounted on a work bench or the like to support the solder pot unit upright and to connect it to a source of power. An annular apron is removably supported on the shell for catching the dross scraped from the molten solder.

Other objects and advantages of the invention will become apparent by reference to the following detailed description and the accompanying drawings illustrating a preferred embodiment thereof, in which—

Fig. 1 is a side elevational view of a group of material melting and holding devices embodying the present invention;

Fig. 2 is a perspective view of one of the devices for holding and melting solder;

Fig. 3 is an enlarged vertical sectional view through the device showing portions thereof in elevation; and Fig. 4 is an exploded perspective view of the device showing several of the components thereof in separated relation to each other.

The electrically heated material melting devices disclosed herein are designed to hold and melt batches of solder, flux, plastic dielectric coating material, and the like for use in soldering together electrical conductors such as the ends of component windings of toroidal coils by dipping the ends of the twisted conductors into a pool of heated flux to flux them, then dipping them into a pool of molten solder to bond them together, and then, if desired, dipping them into a pool of heated plastic insulating material to protect them with a dielectric coating.

Referring to the drawings, there is shown in Fig. 1 an arrangement of three devices 6 detachably supported in upright position on electrical connector receptacles 7 on an elongated outlet box 8 and electrically connected thereby to a source of current for heating them. The outlet box 8 may be mounted on a work bench or other suitable horizontally disposed support 9.

Each of the material melting devices or melting pot units 6 comprises a melting or heating pot 10 made from a copper block and having a cylindrical body 11 with an open chamber 12 formed therein for receiving a removable metal liner cup 13 in which the solder or other material is to be heated. The heating pot 10 has considerable mass for retaining a substantial amount of heat. An outwardly extending flange 14 formed on the upper end of the pot 10 has a rabbet 16 for receiving the upper end of a cylindrical thin walled metal shell 18 such as stainless steel into which the pot 10 is securely pressed. The liner cup 13 which has a horizontally disposed flange 20 overlying the upper end surface of the pot 10 is readily replaceable when worn out.

An annular heating element 23 is removably mounted on the body 11 of the melting pot 10 and comprises a coil winding 24 of resistance heating wire wound on a spool of dielectric material 25. Several convolutions of dielectric strip material may be wound over the coil, and the end portions of the coil winding are suitably anchored to the spool and extended downwardly therefrom to form leads 26. An expansible retainer ring 30 releasably seated in an annular groove 31 in the body of the heating pot 10, holds the heating element 23 on the pot with the upper end of the heating element in engagement with the flange 14. The leads 26 are connected to a pair of terminal prongs 33 mounted on a dielectric base member 34 of a conventional electrical connector plug 35. The base member 34 has a peripheral groove 36 and is adapted to be inserted into the lower end of the shell 18 and removably secured thereto by an annular bead 37 formed on the shell 18 and fitting into the groove 36.

The leads 26 of the heating coil are sufficiently long to permit the heating element 23 to be assembled on the melting pot 10 and to permit the attachment of the ends thereof to the terminal prongs 33 of the connector plug 35 outside of the shell, after which the connector plug is inserted in the shell 18. The interlock between the groove 36 of the connector plug 35 and the bead 37 of the shell 18 secures the connector plug to the shell and also permits the removal of the connector plug therefrom when it is necessary to remove the heating element 23 in order to replace it when it is burned out or to substitute one of a different heating capacity. A solder pot unit 6 and other melting pot units 6 are adapted to be attached to and firmly supported on the upwardly directed electrical connector receptacles 7 which are mounted on the outlet box 8 and connected to a power circuit. With a melting pot unit 6 thus mounted, the prongs 33 of the connector block fit into sockets of the receptacle and engage terminals thereof, the engagement of which serves to connect the heating element 25 to the power circuit and to aid in yieldably retaining the melting pot on the receptacle.

The stainless steel shell 18 which is relatively thin (.010″) and a relatively poor conductor of heat serves to confine the heat from the heating element around the pot 10, and the space between the connector plug 35 and the pot 10 may be filled with suitable heat and electrical insulating material 40 to prevent the downward transfer of heat from the pot.

The solder pot unit 6 is provided with means for catching the dross scraped from the molten solder therein. For this purpose an annular cup-shaped apron 48 is provided which has a central aperture 49 and telescopes over the upper end of the shell 18 into engagement with a shoulder 50 formed thereon. The apron 48 is firmly supported on the shell 18 and cooperates therewith to form a dross receptacle which is readily removable from the shell to permit the dross to be emptied therefrom.

From the above description, it will be seen that compact and efficient electrical melting pot units are provided for melting solder and other types of material and which may readily be attached to and detached from electrical connector receptacles and supported thereon in vertical operative positions and that the melting pot units have heating elements which can readily be removed through the bottom of the units and replaced with heating elements of the same or different heating capacities and that the melting pot units have removable annular receptacles thereon for catching the dross or other waste material removed from the pot.

It is to be understood that the above-described arrangements are simply illustrative of the application of the principles of this invention. Numerous other arrangements may be readily devised by those skilled in the art which will embody the principles of the invention and fall within the spirit and scope thereof.

What is claimed is:

1. An electrical solder pot comprising a cylindrical cup-shaped metal solder pot having a cylindrical body portion and a flange extending outwardly therefrom at the upper end thereof, a cylindrical tubular shell having the upper end thereof secured to the flange of said solder pot for supporting it in the upper portion thereof, a spool of dielectric material mounted on the body portion of said pot and removable therefrom through the lower end of the shell, an expansible retaining ring removably mounted on the body portion of the pot for holding the spool on the solder pot, a heating coil wound on said spool for heating the solder pot and having leads extending downwardly therefrom within said shell, and a connector plug removably secured to the lower end of the shell and having a pair of terminal prongs connected to the leads and insertable in an electrical connector receptacle.

2. An electrical device for holding and melting solder comprising a cylindrical cup-shaped metal melting pot having a cylindrical body portion and a flange extending radially therefrom at the upper end thereof, a thin cylindrical tubular metal shell having the upper end thereof secured to the flange of the pot for supporting the pot in the upper portion thereof, a spool of dielectric material, an electrical heating element thereon with leads extending downwardly therefrom, releasable means for removably securing said spool on the solder pot, a base member of insulating material removably secured to the lower end of the shell, a pair of metal prongs mounted on said base and projecting downwardly therefrom connected to the leads from said coil and insertable in an electrical connector receptacle for electrically connecting the heating element to a source of power and for supporting said shell upright, an annular removable apron slidably mounted on said shell, and a shoulder formed on said shell for supporting the apron in a predetermined position thereon for catching the dross scraped from the solder in the pot.

3. An electrical solder pot comprising a cylindrical cup-shaped metal solder pot having a cylindrical body portion and a flange extending radially therefrom at the upper end thereof, a removable metal cup forming a liner for said pot, a thin walled tubular metal shell having the upper end thereof secured to the flange of the pot for supporting the pot in the upper portion thereof, an annular electrical heating element encircling the body portion of said pot and having leads extending downwardly therefrom within said shell, releasable means for removably securing said heating element on the solder pot, a base member of insulating material removably secured to the lower end of the shell, and a pair of metal prongs mounted on said base and projecting downwardly therefrom, said prongs being connected to the leads from said heating element and insertable into an electrical connector receptacle for electrically connecting the heating element to a source of power and for supporting said shell upright.

4. An electrical solder pot which comprises, a tubular shell having open ends and a crimped inwardly extending projection near the lower end thereof, a metal cup having an outer diameter less than the inner diameter of the shell, an outwardly extending flange on the upper extremity of the cup for engaging the upper edge of the shell to support the cup within the upper open end of the shell, an electrical coil slidably positioned on the cup, resilient means mounted on the lower extremity of the cup for retaining the coil thereon, and a resilient connector plug compressed within the lower open end of the shell and held by the crimped projection for connecting the coil to electrical power.

5. An electrical solder pot which comprises, a tubular shell having open ends and an upper diameter smaller than the lower diameter forming a shoulder around the shell, a metal cup having an outer dimeter less than the upper diameter of the shell and an annular groove formed around the lower extremity thereof, an outwardly extending flange on the upper extremity of the cup for engaging the upper edge of the shell to support the cup within the uper open end of the shell, an electrical coil slidably positioned around the cup, an expandable ring mounted on said cup within the annular groove for retaining the coil on the cup, a crimped inwardly extending projection formed around the lower extremity of the shell, a resilient connector plug compressed within the lower open end of the shell and having an annular groove for mating with crimped projection for connecting the coil to electrical power, and a cup-shaped apron having an aperture in the bottom thereof of a diameter equal to the upper diameter of the shell and slidably mounted over the upper portion of the shell in engagement with said shoulder.

References Cited in the file of this patent

UNITED STATES PATENTS

| 1,850,076 | Hacker | Mar. 22, 1932 |
| 2,097,974 | Goodchild | Nov. 2, 1937 |
| 2,134,805 | Sessions | Nov. 1, 1938 |
| 2,212,795 | Sampson | Aug. 27, 1940 |
| 2,540,095 | Buehler | Feb. 6, 1951 |
| 2,599,485 | Robinson | June 3, 1952 |
| 2,708,710 | De Verter | May 17, 1955 |

FOREIGN PATENTS

| 517,324 | France | Dec. 17, 1920 |
| 58,409 | Netherlands | Oct. 15, 1946 |